United States Patent [19]

Kramer

[11] Patent Number: 5,449,131
[45] Date of Patent: Sep. 12, 1995

[54] VERTICAL NOSE STRAKE FOR AIRCRAFT STABILITY AND CONTROL

[75] Inventor: Brian Kramer, Redondo Beach, Calif.

[73] Assignee: Eidetics International, Inc., Torrance, Calif.

[21] Appl. No.: 188,097

[22] Filed: Jan. 28, 1994

[51] Int. Cl.$^6$ ............... B64C 5/06; B64C 3/38; B64C 23/02; B64C 39/12
[52] U.S. Cl. .................. 244/91; 244/3.24; 244/3.29; 244/45 A; 244/206
[58] Field of Search ............ 244/3.24, 3.29, 199, 244/45 A, 206, 91, 90 B

[56] References Cited

U.S. PATENT DOCUMENTS

| | | | |
|---|---|---|---|
| 2,740,596 | 4/1956 | Lee | 244/199 |
| 2,764,373 | 9/1956 | Anderson et al. | 244/199 |
| 3,642,234 | 2/1972 | Kamber et al. | 244/45 A |
| 3,883,094 | 5/1975 | Mederer | 244/45 A |
| 4,786,009 | 11/1988 | Rao et al. | 244/213 |
| 4,964,593 | 10/1990 | Kranz | 244/3.24 |
| 5,020,740 | 6/1991 | Thomas | 244/45 A |
| 5,083,279 | 1/1992 | Burdoin | 244/45 A |
| 5,100,081 | 3/1992 | Thomas | 244/91 |
| 5,139,215 | 8/1992 | Peckham | 244/206 |
| 5,201,829 | 4/1993 | Peters, Jr. | 244/199 |
| 5,207,397 | 5/1993 | Ng et al. | 244/45 A |
| 5,249,761 | 10/1993 | Schroppel | 244/3.24 |
| 5,322,243 | 6/1994 | Stoy | 244/45 A |
| 5,326,050 | 7/1994 | Zell | 244/199 |

Primary Examiner—Andres Kashnikow
Assistant Examiner—Virna Lissi Mojica
Attorney, Agent, or Firm—Blakely, Sokoloff, Taylor & Zafman

[57] ABSTRACT

A pivotal strake located at the nose section of an aircraft forebody. The strake pivots about an axis that is essentially perpendicular to the surface of the nose section. Rotation of the strake will influence the forebody vortices to create a resulting yawing moment on the aircraft. The rotating strake can be used to provide directional control of an aircraft, even at high angles of attack.

15 Claims, 3 Drawing Sheets

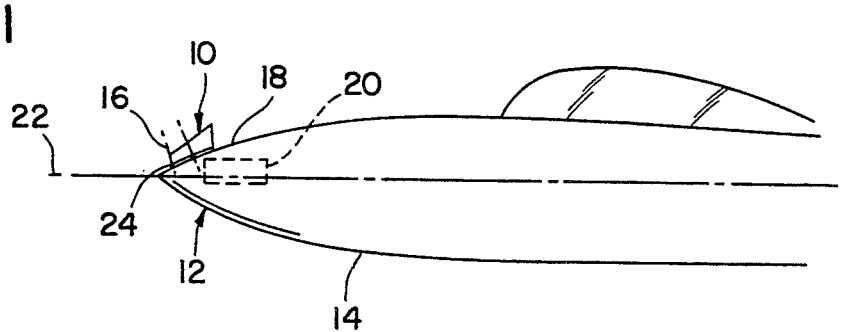
FIG. 1
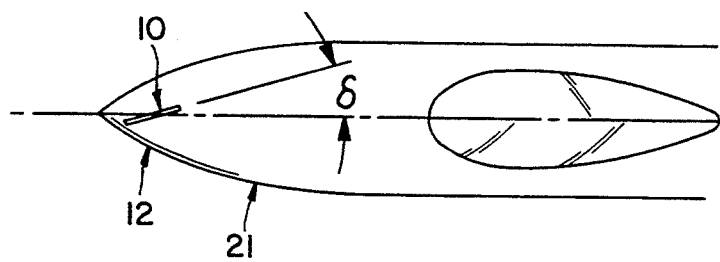
FIG. 2
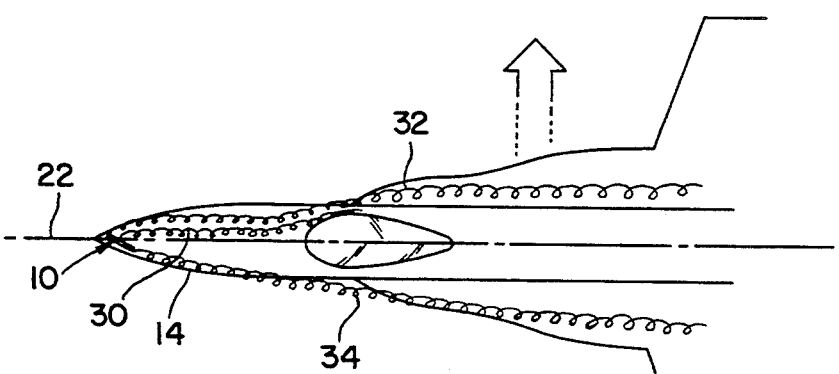
FIG. 3
FIG. 4

VERTICAL NOSE STRAKE FOR AIRCRAFT STABILITY AND CONTROL

BACKGROUND OF THE INVENTION

1. Field of the Invention

The present invention relates to a pivotable vertical strake located on the upper surface of the nose section of an aircraft forebody.

2. Description of Related Art

High performance aircraft must be capable of providing aerodynamic stability and control even at high angles of attack. More particularly, the aircraft must have the ability to roll robustly about the velocity vector of the plane. Lateral and directional control is typically accomplished through aft control surfaces such as wing ailerons and the tail rudder. At high angles of attack, the wash of the wing decreases the effectiveness of the rudder in controlling the aircraft. For this reason there has been increasing interest in utilizing forebody vortex control for aircraft flying at high angles of attack. Manipulating the forebody vortices can result in a side force on the forebody which creates a yawing moment on the aircraft.

Malcolm, G. N., "Forebody Vortex Control", Progress in Aerospace Sciences, Vol. 28, pp. 171–234, 1991 provides a general discussion on the various approaches to controlling forebody vortices including strakes located on the surface of the forebody and pneumatic systems with blowing jets or slots.

The use of fixed strakes on the forebody has been found to eliminate natural asymmetries in the flow and to prevent the aircraft from departing at high angles of attack. Fixed strakes typically have large surface areas that have been found to interfere with the imaging capability of the plane's radar, which is typically located in the forebody of the aircraft. Additionally, the strakes add stress to the structure of the radome. U.S. Pat. No. 5,207,397 issued to Ng et al, discloses a pair of strakes that are coupled to the nose section and can rotate about the longitudinal axis of the aircraft. The rotatable strakes were found to provide active vortex control about the forebody of the plane. It would be desirable to provide a more effective vortex control device than the systems deployed in the prior art.

SUMMARY OF THE INVENTION

The present invention is a pivotal strake located at the nose section of an aircraft forebody. The strake pivots about an axis that is essentially perpendicular to the upper surface of the nose section. Rotation of the strake will influence the forebody vortices to create a resulting yawing moment on the aircraft. The pivotal strake can be used to provide primarily directional control of an aircraft, even at high angles of attack.

It is therefore an object of the present invention to provide a control surface that allows directional control of an aircraft even at high angles of attack.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a side view of the nose section of an aircraft with a pivotal strake;

FIG. 2 is a top view of the nose section of FIG. 1;

FIG. 3 is a top view of an aircraft in a wind tunnel with the strake rotated through a predetermined angle;

FIG. 4 is a side view of the aircraft of FIG. 3;

DETAILED DESCRIPTION OF THE INVENTION

Figure 5A:
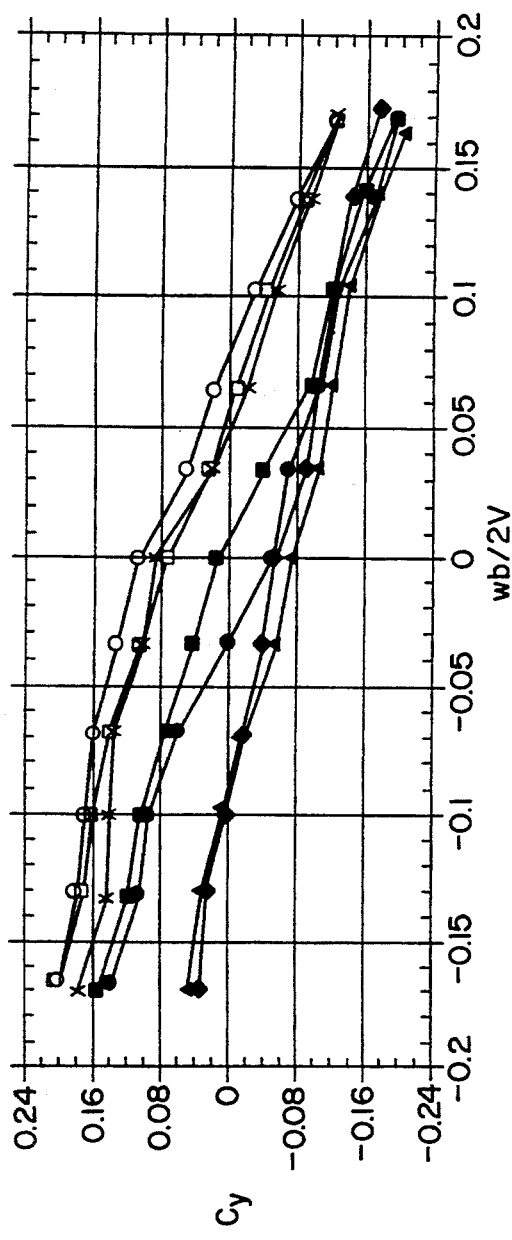
FIG. 5a is a graph showing the effects of rotating the strake on the side force coefficient of a F/A-18 aircraft.

Referring to the drawings more particularly by reference numbers, FIGS. 1 and 2 show a strake 10 pivotally connected to the nose section 12 of an aircraft forebody 14. The strake 10 rotates about an axis that is at an angle relative to the longitudinal axis of the forebody 14. In the preferred embodiment, the strake 10 rotates about an axis 16 that is essentially perpendicular to the surface 18 of the nose section 12. The strake 10 can be rotated by any suitable rotation means 20 such as an hydraulic torque motor or an electric motor. Although shown directly attached to the strake 10, the rotation means 20 may be remotely coupled to the strake 10 through a flexible drive shaft or a gear assembly. The rotation means 20 is capable of rotating the strake 10 through an angle $\delta$ relative to the longitudinal axis 22 of the aircraft 14. The pivot axis 16 may be located at the leading edge of the strake 10 or at the center of the strake 10. It may be desirable to locate the pivot axis 16 at the center location to reduce the stress on the strake 10.

The strake 10 has been found to be effective in controlling forebody vortices when mounted to a F/A18 aircraft. In the preferred embodiment, the strake is 5 inches long and is located 3.33 inches aft from the tip of the nose section 12. The strake 10 preferably has a height of 1.33 inches at the leading edge and 3 inches at the trailing edge. It has been found that the strake 10 is effective when rotated through an angle $\delta$ of approximately $\pm 70°$. A seal 24 is typically attached to the strake 10 to prevent cross flow across the nose section 21 and under the strake 10. To simplify the seal design it may be desirable to locate the pivot axis 16 at the leading edge of the strake 10.

When the strake 10 is at a zero angle $\delta$ and the aircraft is flying with no sideslip, the strake 10 has no effect on the forebody vortices of the plane. If the strake 10 is rotated, or the aircraft experiences a sideslip, the strake 10 will influence the forebody vortices to create a yawing moment on the plane. FIGS. 3 and 4, show a rotating strake 10 attached to a 6% F/A18 model tested in a wind tunnel with the strake 10 rotated to an angle of 50° (trailing edge of strake to the left of a forebody) and the model located at an angle of attack of 45°.

The rotated strake 10 creates a strake vortex 30 that extends from the leading edge of the strake 10 aft and to the right of the longitudinal axis 22. The strake vortex 30 pulls the right vortex 32 on the right side of the forebody toward the body and the longitudinal axis of the plane. The strake vortex 30 also pushes the left vortex 34 away from the forebody and longitudinal axis of the plane. The result is a decrease in the air pressure on the right side of the forebody 14, which creates a resultant force on the forebody 14 that has a vector directed toward the right side of the longitudinal axis. This resultant force is located away from the center of gravity of the aircraft, wherein the product of the resultant force and the moment arm produce the positive yawing moment on the aircraft indicated by the arrow in FIG. 3. The yawing moment has been found to be proportional to the deflection angle δ of the strake 10, thereby creating a system that effectively provides primarily directional control of the aircraft.

The rotating vertical nose strake 10 can be used in both a stability augmentation system (SAS) and a command augmentation system (CAS). In a SAS system the flight controls would utilize the strake 10 to augment the basic static and dynamic stability of the aircraft ($C_{nB}$ and $C_{nr}$), or actively move the strake to preserve the baseline aircraft performance. In a CAS system, the rotating strake 10 can be coupled to the pilot controls, such as the rudder, to improve the aircrafts maneuverability at medium to high angles of attack.

Figure 5B:
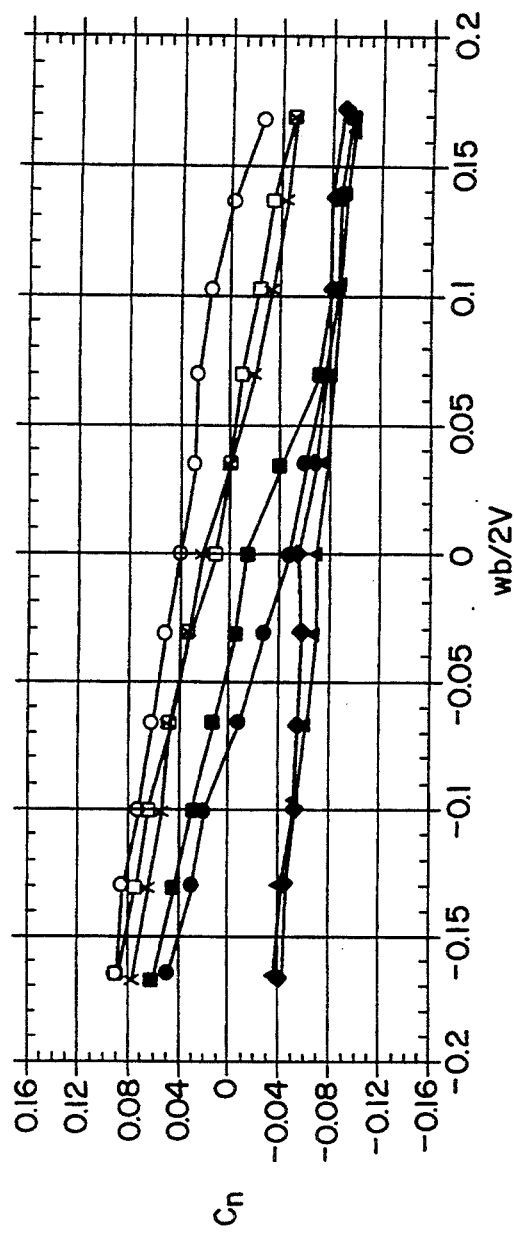
FIG. 5b is a graph showing the effects of rotating the strake on the yawing moment coefficient of a F/A18 aircraft.
Figure 5C:
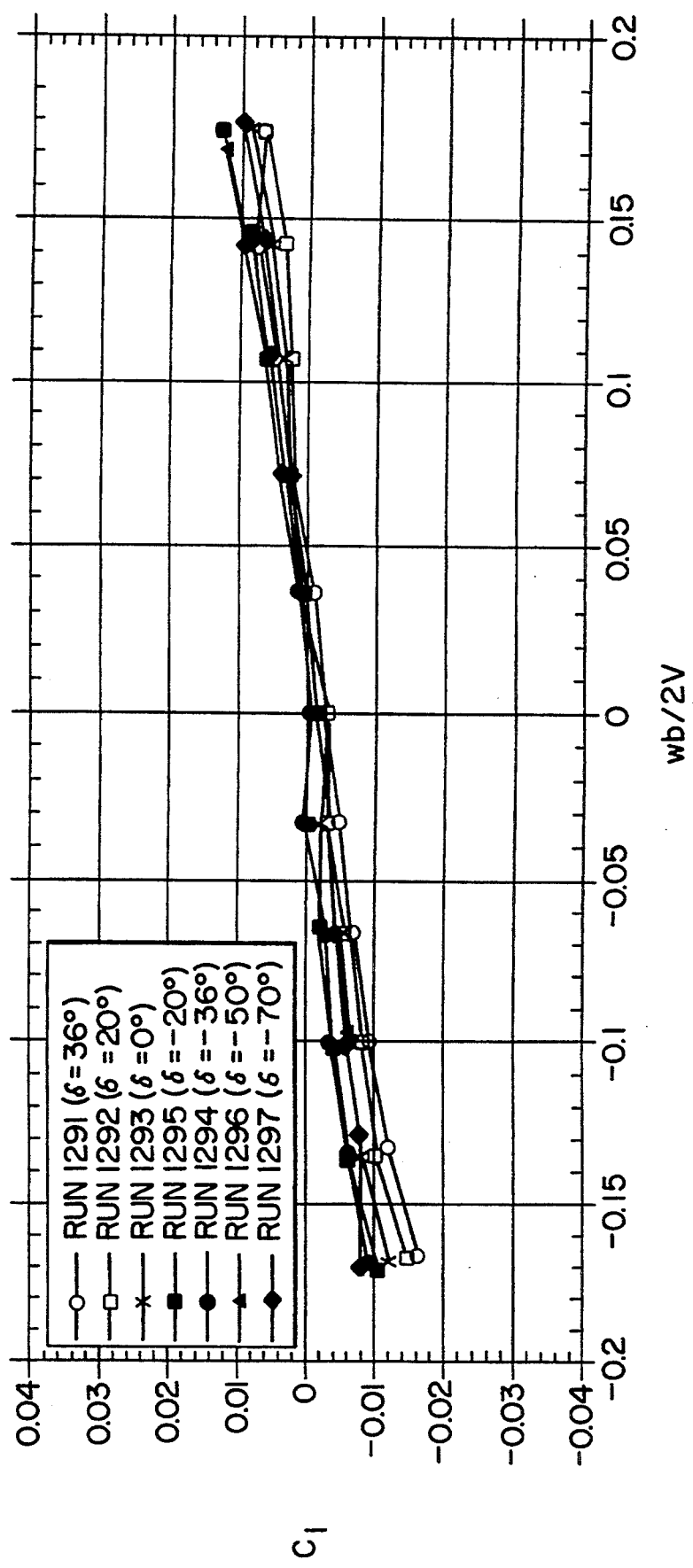
FIG. 5c is a graph showing the effects of rotating the strake on the rolling moment coefficient of a F/A18 aircraft.

FIGS. 5a–c show the results of a strake mounted to a 6% F/A18 model in a wind tunnel where the strake 10 was located at δ angles of −70°, −50°, −36°, −20°, 0°, +20° and +36° and an angle of attack of 51°. As shown in FIG. 5a, trailing edge left deflections of +20° and +36° result in positive yawing moments relative to the baseline. Negative deflections result in negative yawing moments. The strake 10 was found to increase anti-spin tendencies to provide static and dynamic stability. Additionally, the strake has been found to initiate and arrest roll rates about the velocity vector at medium to high angles of attack.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An aircraft, comprising:
an aircraft forebody that has an outer surface that forms a nose section, said forebody having a longitudinal axis; and,
a strake located at said nose section of said forebody, said strake being adapted to rotate about an axis that is at an angle relative to the longitudinal axis of said forebody to create a yawing moment on said aircraft forebody.

2. The aircraft as recited in claim 1, wherein said strake rotates about a pivot point located at a leading edge of said strake.

3. The aircraft as recited in claim 1, wherein said strake rotates about a pivot point located at a center of said strake.

4. The aircraft as recited in claim 1, further comprising control means for rotating said strake.

5. The aircraft as recited in claim 1, wherein said strake is rotated through an angle of approximately ±70° relative to the longitudinal axis of said forebody.

6. The aircraft as recited in claim 1, wherein said strake has an aspect ratio of approximately 2:1.

7. The aircraft as recited in claim 1, wherein said rotation axis of said strake is essentially perpendicular with said surface of said forebody.

8. A control surface for an aircraft, wherein the aircraft has an outer surface that forms a nose section of an aircraft forebody that has a longitudinal axis, comprising:
a strake located at the nose section of the forebody, said strake being adapted to rotate about an axis at an angle relative to the longitudinal axis of the forebody to create a yawing moment on the aircraft forebody.

9. The aircraft as recited in claim 8, wherein said strake rotates about a pivot point located at a leading edge of said strake.

10. The aircraft as recited in claim 8, wherein said strake rotates about a pivot point located at a center of said strake.

11. The aircraft as recited in claim 8, further comprising control means for rotating said strake.

12. The aircraft as recited in claim 8, wherein said strake is rotated through an angle of approximately ±70° relative to the longitudinal axis of the forebody.

13. The aircraft as recited in claim 8, wherein said strake has an aspect ratio of approximately 2:1.

14. The aircraft as recited in claim 8, wherein said rotation axis of said strake is essentially perpendicular with the surface of the forebody.

15. A method for creating a yawing moment on an aircraft forebody that has a longitudinal axis, comprising the steps of:
rotating a strake about an axis that is at an angle relative to the longitudinal axis of the forebody to create a yawing moment on the forebody.

* * * * *